US011628848B2

(12) United States Patent
McGill et al.

(10) Patent No.: US 11,628,848 B2
(45) Date of Patent: Apr. 18, 2023

(54) SYSTEMS AND METHODS FOR TRAINING A NEURAL NETWORK FOR ESTIMATING A TRAJECTORY OF A VEHICLE

(71) Applicant: Toyota Research Institute, Inc., Los Altos, CA (US)

(72) Inventors: Stephen G. McGill, Broomall, PA (US); Guy Rosman, Newton, PA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 496 days.

(21) Appl. No.: 16/836,265

(22) Filed: Mar. 31, 2020

(65) Prior Publication Data

US 2021/0300389 A1    Sep. 30, 2021

(51) Int. Cl.
*G06N 3/08* (2023.01)
*B60W 40/107* (2012.01)
(Continued)

(52) U.S. Cl.
CPC .......... *B60W 40/107* (2013.01); *B60W 30/12* (2013.01); *G06N 3/08* (2013.01); *G06V 20/588* (2022.01)

(58) Field of Classification Search
CPC ...... G06N 3/0454; G06N 3/08; G05D 1/0088; B60W 40/107; B60W 30/12;
(Continued)

(56) References Cited

U.S. PATENT DOCUMENTS 10,318,890 B1    6/2019   Kravets et al.
10,324,467 B1    6/2019   Abeloe
(Continued)

FOREIGN PATENT DOCUMENTS

| CN | 110046710 A | 7/2019 |
| CN | 110135623 A | 8/2019 |
| WO | 2010144947 A1 | 12/2010 |

OTHER PUBLICATIONS

Machine learning for combinatorial optimization: a methodological tour d'horizon (https://arxiv.org/pdf/1811.06128.pdf), Nov. 15, 2018.

*Primary Examiner* — Kenneth J Malkowski
(74) *Attorney, Agent, or Firm* — Dinsmore & Shohl LLP

(57) ABSTRACT

Systems and methods for training a neural network for estimating a trajectory of a vehicle are disclosed. In one embodiment, a system includes one or more processors, and a non-transitory computer-readable medium storing computer-readable instructions. The computer-readable instructions cause the one or more processors to receive sensor data of a plurality of examples from a plurality of vehicle sensors, input the sensor data into a sensor data neural network to generate a sensor data intermediate space and receive structured data of the plurality of examples. The computer-readable instructions cause the one or more processors to input the structured data into a structured data neural network to generate a structured data intermediate space, calculate a first loss between the sensor data intermediate space and the structured data intermediate space using a first loss function, and provide the first loss to the sensor data neural network and the structured data neural network.

16 Claims, 4 Drawing Sheets

(51) Int. Cl.
*B60W 30/12* (2020.01)
*G06V 20/56* (2022.01)

(58) Field of Classification Search
CPC ............. B60W 60/0011; G06V 20/588; G06V 10/764; G06K 9/627
See application file for complete search history.

(56) References Cited

U.S. PATENT DOCUMENTS

| | | |
|---|---|---|
| 2019/0042933 A1 | 2/2019 | Powell et al. |
| 2019/0146474 A1 | 5/2019 | Cella et al. |
| 2019/0147335 A1 | 5/2019 | Wang et al. |
| 2019/0147610 A1 | 5/2019 | Nascimento et al. |
| 2019/0384303 A1* | 12/2019 | Muller .................... G01S 7/417 |

\* cited by examiner

SYSTEMS AND METHODS FOR TRAINING A NEURAL NETWORK FOR ESTIMATING A TRAJECTORY OF A VEHICLE

TECHNICAL FIELD

The present specification relates to training neural networks, and more particularly, to training a neural network for estimating a trajectory of a vehicle using modified structured data.

BACKGROUND

Autonomous and semi-autonomous vehicles may utilize a neural network to estimate vehicle trajectories based on sensor input regarding the environment. Commonly, the neural network is trained using input sensor data, such as images from cameras, point cloud data from a LiDAR sensor, and the like. Thus, training the neural network requires actual sensor data, which may be limited and not account for all possible driving scenarios. For example, no sensor data may exist for a particular driving scenario and thus the neural network may not accurately estimate a trajectory of the vehicle in such a scenario.

SUMMARY

In one aspect, a system for training a neural network for estimating a trajectory of a vehicle includes one or more processors and a non-transitory computer-readable medium storing computer-readable instructions. The computer-readable instructions, when executed by the one or more processors, cause the one or more processors to receive sensor data of a plurality of examples from a plurality of vehicle sensors, input the sensor data into a sensor data neural network to generate a sensor data intermediate space and receive structured data of the plurality of examples. The computer-readable instructions further cause the one or more processors to input the structured data into a structured data neural network to generate a structured data intermediate space, calculate a first loss between the sensor data intermediate space and the structured data intermediate space using a first loss function, and provide the first loss to the sensor data neural network and the structured data neural network.

In another aspect, a method for training a neural network for estimating a trajectory of a vehicle includes receiving sensor data of a plurality of examples from a plurality of vehicle sensors, and inputting the sensor data into a sensor data neural network to generate a sensor data intermediate space. The method further includes receiving structured data of the plurality of examples, inputting the structured data into a structured data neural network to generate a structured data intermediate space, calculating a first loss between the sensor data intermediate space and the structured data intermediate space using a first loss function, and providing the first loss to the sensor data neural network and the structured data neural network

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
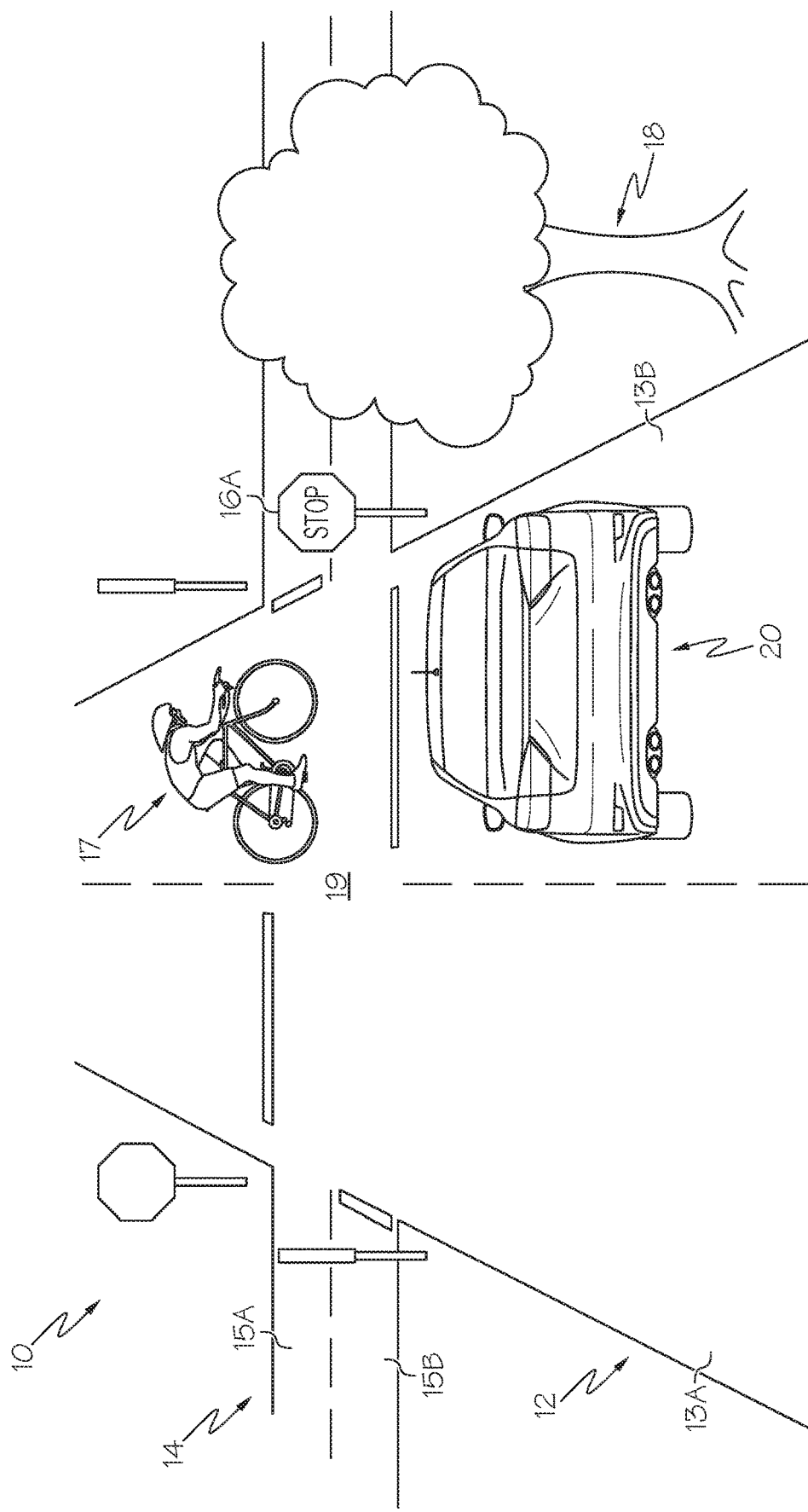
FIG. 1 schematically depicts an example environment of a vehicle.

The embodiments disclosed herein are directed to vehicles, systems and methods for training a neural network for estimating a trajectory of a vehicle. Training a neural network for an autonomous or semi-autonomous vehicle involves inputting sensor data and known driver behavior so that the neural network can learn how to navigate many different driving scenarios. As an example, one scenario is how to brake the vehicle when there is a red traffic light and there is a vehicle slowing down ahead of the ego vehicle. As used here, the term "ego vehicle" means the vehicle having the neural network and generating sensor data from a plurality of sensors used to both train the neural network and operate in the environment.

To train the neural network for a particular driving scenario, the neural network receives sensor data corresponding to that particular driving scenario or a similar driving scenario. Sensor data may include, but is not limited to, video data, LiDAR data, radar data, time-of-flight sensor data, and the like. However, generating sensor data from real-life vehicles is time consuming and costly. Additionally, real-life sensor data may cover only a very small fraction of the near-infinite number of driving scenarios that a driver or an autonomous vehicle may encounter.

Simulation data may be used to train the neural network in addition to, or in lieu of, real-life sensor data from physical sensors. Simulation data simulates the sensor data itself, which is then inputted into the neural network for training purposes. As an example, a video simulation may simulate a particular driving scenario from an ego vehicle's perspective. Such a video simulation may be computer-generated, for example. However, generating video simulations may also be time consuming, costly, and require a significant amount of computer processing power.

Thus, training data for particular scenarios in the form of real-life sensor data or simulation data may not be available for many driving scenarios.

Embodiments of the present disclosure improve on training neural networks by enabling structured data to be easily manipulated in a manner such that unique driving scenarios may be generated and inputted into the neural network easily and quickly. As used herein "structured data" means data other than raw sensor data, and includes, but is not limited to, outputs of a detection algorithm (e.g., lane detection, vehicles and other road agents detected by an object recognition algorithm, etc.), map data (e.g., high definition map data), or any other observed or generated data that represents the environment of a vehicle. "Sensor data" is the raw data that is generated by one or more physical sensors on a vehicle in the environment.

As described in more detail below, a method of training a neural network to predict vehicle trajectories comprises two neural network paths: a sensor data path and structured data path. In the sensor data path, raw sensor data (e.g., image data, LiDAR data, and the like) is inputted into a sensor data neural network that outputs a sensor data intermediate space (i.e., latent space), which may then be inputted into a sensor data reconstruction neural network that recreates the input sensor data. A loss function may be applied to calculate the loss between the input sensor data and the reconstructed sensor data to minimize the loss therebetween. Similarly, in the structured data path, structured data (e.g., detected lanes, detected obstacles, map data, and the like) corresponding to the environment generating the sensor data is inputted into a structured data neural network that outputs a structured data intermediate space (i.e., latent space), which may then be inputted into a structured data reconstruction neural network that recreates the structured data. A loss function may be applied to calculate the loss between the input structured data and the reconstructed structured data to minimize the loss therebetween.

A loss between the sensor data intermediate space and the structured data intermediate space is determine by a loss function. This loss is then fed back to the sensor data neural network and the sensor data neural network to decrease the loss therebetween over time. Thus, the sensor data intermediate space and the structured data intermediate space may become aligned over time after a plurality of examples are inputted into the sensor data neural network and the structured data neural network.

Data from the structured data intermediate space or the sensor data intermediate space may be inputted into a trajectory planning neural network to estimate one or more vehicle trajectories. Aligning the structured data intermediate space and the sensor data intermediate space may create a more robust system in that both sensor data and structured data are used to train the overall neural network and therefore make trajectory predictions.

Use of the structured data intermediate space as input into the trajectory planning neural network enables the easy generation of very diverse traffic scenarios. Rather than generating full sensor data (e.g., video data or point cloud data) or simulated sensor data, modified structured data may be generated by merely moving points and or lines in the structured data. For example, a non-existent car may be added to structured data based on previous sensor data by changing one or more variables in the structured data. Such a process is much simpler than adding a vehicle to video simulation data or a simulated point cloud. Thus, the modified structured data may be used to generate a vast number of different driving scenarios for estimating vehicle trajectories.

Various embodiments of systems and methods for training a neural network for estimating vehicle trajectories are described below.

Referring now to FIG. 1, a non-limiting example of a vehicle environment 10 is schematically depicted. The environment 10 has a first road 12 with a first lane 13A for travel in one direction and a second lane 13B for travel in an opposite direction. The environment 10 further includes an intersection 19 wherein a second road 14 intersects with the first road 12. The second road has a first lane 15A for travel in a first direction and a second lane 15B for travel in a second direction. An ego vehicle (not shown) operating in the environment 10 of FIG. 1 may be some distance behind a vehicle 20 in the second lane 13B as both the vehicle 20 and the ego vehicle approach a stop sign 16. Other objects may be in the environment, such as a tree 18 and a bicyclist 17.

Figure 2:
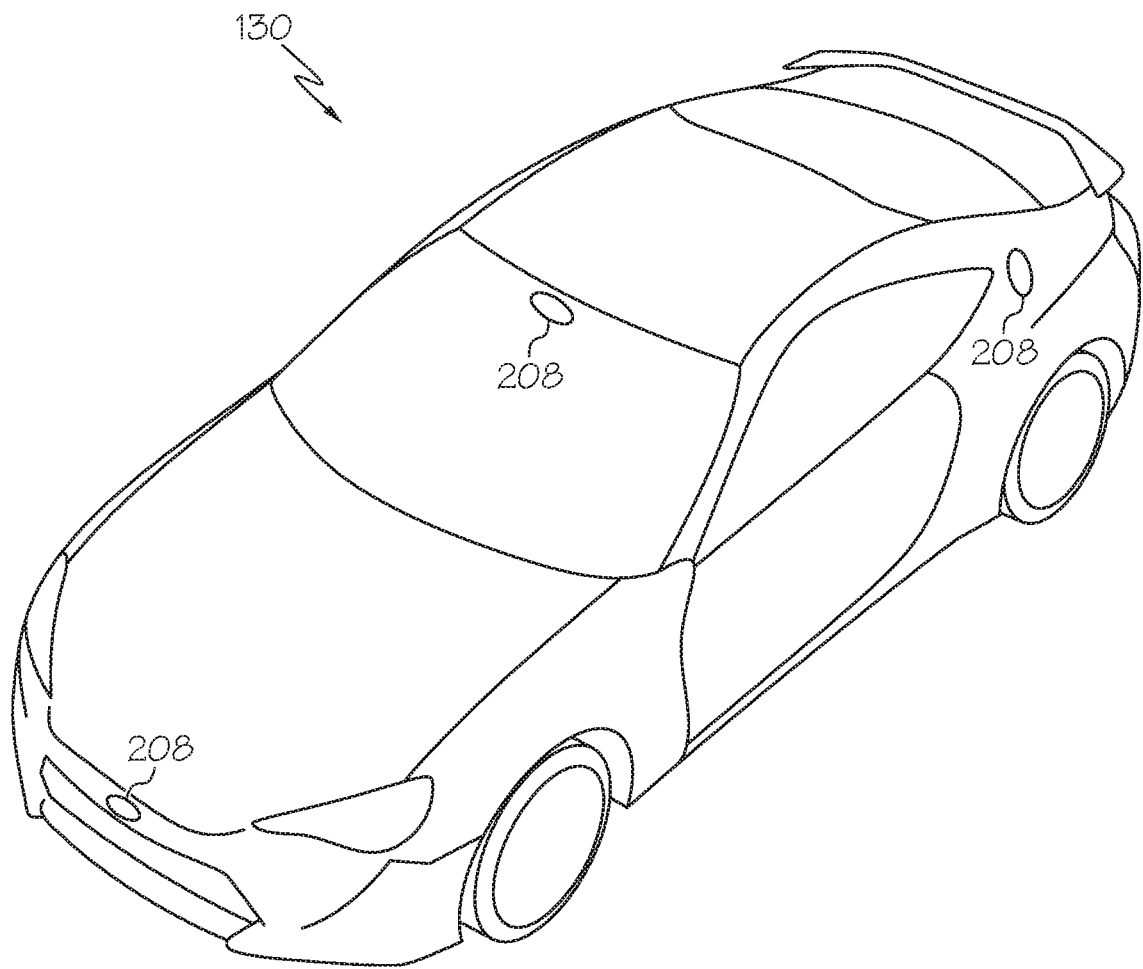
FIG. 2 schematically depicts an example vehicle, according to one or more embodiments described and illustrated herein.

Referring now to FIG. 2, a non-limiting example of a vehicle 130 (e.g., an ego vehicle) having sensors 208 is schematically illustrated. The vehicle 130 may be driven by a human driver and collect sensor data using the sensors 208 for various driving scenarios. This sensor data may then be used to train the neural networks as described in more detail below.

The sensors 208 may be any known or yet-to-be-developed sensors. Non-limiting example sensors include video cameras, LiDAR sensors, radar sensors, time-of-flight sensors, proximity sensors, and the like. The sensors 208 capture data of the environment. Referring again to FIG. 1, sensors 208 configured as video cameras capture video of the vehicle 20, the stop sign 16, the intersection 19, and the like. In the case of LiDAR sensors, point cloud data of the various objects in the environment 10 is generated.

In addition, structured data of the environment 10 is gathered and/or generated from the sensor data. In the case of gathered structured data, high definition map data of the environment 10 may be accessed, such as from a remote database. The high definition map data may include information such as the number of lanes, the geometry of the lanes, the speed limit, the geometry of an intersection, buildings and other objects in the area, and the like. In the case of generating structured data, one or more object recognition algorithms may be executed on the sensor data generated by the one or more sensors to detect the lanes and objects within the environment. The one or more object recognition algorithms may be executed on the vehicle 130 and/or offline at a remote server, for example. Any known or yet-to-be-developed object recognition algorithms may be used to detect the objects in the environment. For example, referring to FIG. 1, an object recognition algorithm may detect vehicle 20, and generate a bounding box around it that is represented in the structured data. The existence of the vehicle 20 and attributes and relationship to the ego vehicle may be stored in the structured data. It should be understood that embodiments of the present disclosure are not limited by any format for the structured data, and that the structured data may take on any format and/or organization.

Figure 3:
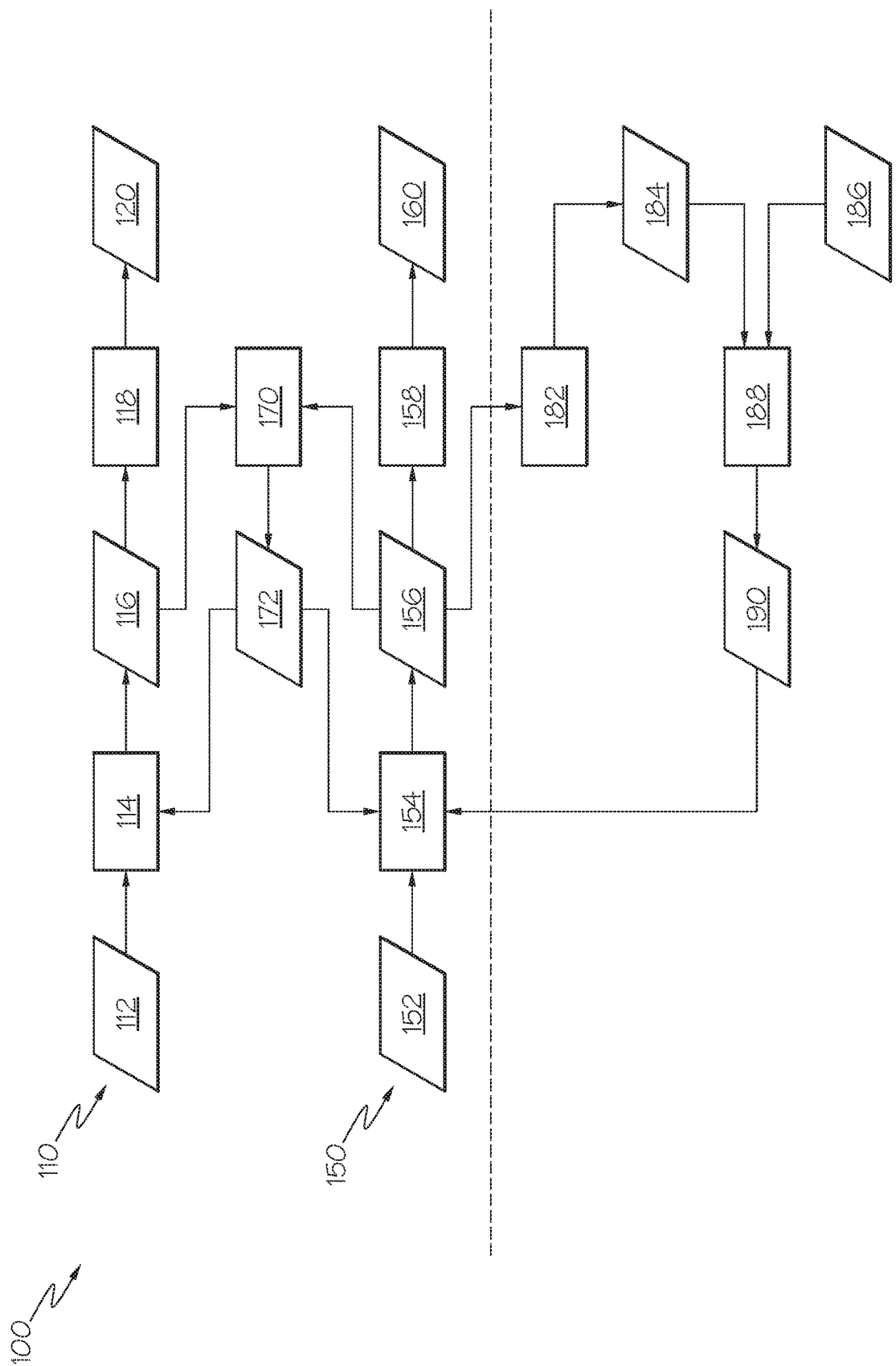
FIG. 3 schematically depicts an example dataflow diagram of a method for training a neural network for estimating a trajectory of a vehicle according to one or more embodiments described and illustrated herein.

Referring now to FIG. 3, a non-limiting method of a dataflow diagram 100 for training a neural network for estimating a vehicle trajectory is illustrated. The illustrated dataflow comprises a sensor data path 110 and a structured data path 150. The sensor data path 110 will be described followed by a description of the structured data path 150. Sensor data 112 may represent a plurality of vehicle maneuver examples. As stated above, the sensor data 112 represents the environment as observed by the sensors of the ego vehicle.

The sensor data 112 is provided to sensor data neural network 114. The sensor data neural network 114 creates a sensor data intermediate space 116, which may be a low dimensional a latent space, for example. Embodiments are not limited by the type of neural network employed by the sensor data neural network 114. Any known or yet-to-be-developed neural network may be used to generate the sensor data intermediate space 116. As a non-limiting example, the sensor data intermediate space 116 may be a vector comprising about 100 latent variables.

Next, the sensor data intermediate space 116 is provided as input to a sensor data reconstruction neural network 118. The sensor data reconstruction neural network 118 uses the sensor data intermediate space 116 to reconstruct the sensor data 112 that was provided as input to the sensor data neural network 114. However, differences may exist between the sensor data 112 and the reconstructed sensor data 120 that is outputted from the sensor data reconstruction neural network 118. Although not shown, a loss function may calculate a difference (i.e., loss) between the sensor data 112 and the reconstructed sensor data 120. The output of the loss function may be provided to the sensor data neural network 114 and/or the sensor data reconstruction neural network 118 to minimize the loss calculated by the loss function over time. In some embodiments, the sensor data reconstruction neural network 118 is not used.

The structured data path 150 may operate in parallel with the sensor data path 110. Structured data 152 corresponding to the environment captured by the sensor data 112 is provided as input to a structured data neural network 154. The structured data may be observed or generated structured data as described above. The structured data neural network 154 creates a structured data intermediate space 156, which may be a low dimensional latent space, for example. Embodiments are not limited by the type of neural network employed by the structured data neural network 154. Any known or yet-to-be-developed neural network may be used to generate the structured data intermediate space 156. As a non-limiting example, the structured data intermediate space 156 may be a vector comprising about 100 latent variables.

The structured data intermediate space 156 may be provided as input to a structured data reconstruction neural network 158. The structured data reconstruction neural network 158 uses the structured data intermediate space 156 to reconstruct the structured data 152 that was provided as input to the structured data neural network 154. However, differences may exist between the structured data 152 and the reconstructed structured data 160 that is outputted from the structured data reconstruction neural network 158. Although not shown, a loss function may calculate a difference (i.e., loss) between the structured data 152 and the reconstructed structured data 160. The output of the loss function may be provided to the structured data neural network 154 and/or the structured data reconstruction neural network 158 to minimize the loss calculated by the loss function. In some embodiments, the structured data reconstruction neural network 158 is not used.

The sensor data path 110 and the structured data path 150 are linked by a loss function 170 that receives as inputs the sensor data intermediate space 116, which may be all of the data of the sensor data intermediate space 116 or some sub-set thereof, and the structured data intermediate space 156, which may be all of the data of the structured data intermediate space 156 or some sub-set thereof. The loss function 170 calculates a loss 172 (i.e., a difference) between the sensor data intermediate space 116 and the structured data intermediate space 156. The loss 172 is provided to the sensor data neural network 114 and or the structured data neural network 154 to decrease subsequently calculated losses between the two intermediate spaces over time. In this manner, the sensor data influences the structured data intermediate space 156 and vice-versa, thereby providing a more robust neural network with simply sensor data or structured data alone.

A plurality of examples in the form of sensor data 112 and structured data 152 are inputted into the respective neural networks until the various loss functions are minimized, for example.

Still referring to FIG. 3, the structured data intermediate space 156 is provided as an input to a trajectory estimation neural network 182 that outputs one or more estimated vehicle trajectories 184 based on the structured data intermediate space 156. The one or more estimated vehicle trajectories 184 represent ideal trajectories for an ego vehicle based on the environment as represented by the sensor data 112 and/or the structured data 152. In some embodiments, another loss function 188 receives as input the one or more estimated vehicle trajectories 184 and one or more ground truth trajectories 186, and calculates a loss 190 that is then provided to the structured data neural network 154 to minimize the loss 190 over time. The one or more ground truth trajectories 186 may take on any form. As one non-limiting example, the one or more ground truth trajectories may be an actual trajectory taken by the driver of the ego vehicle. Thus, the loss function may compare an estimated trajectory with an actual trajectory taken by the driver over a period of time.

Embodiments of the present disclosure enable easy creation of many, many different driving scenarios to train a neural network, which in the present example is the structured data neural network 154. To generate different driving scenarios, a pre-existing structured data example (i.e., observed structured data) may be manipulated to change the environment represented by the pre-existing structured data. For example, lanes may be shifted, added or removed, intersections may be changed, objects such as vehicles may be shifted, added or removed, and the like. The representations of objects in the structured data are simple and easily modified. For example, to add a vehicle to the structure data, only a few variable may be changed. This is in contrast to generating simulated sensor data, which requires recreation of the scene with simulation video or a simulated point cloud, for example. Even further, the use of modified structured data enables the structured data neural network 154 and the trajectory estimation neural network to be trained without the need for continued collection of sensor data and structured data of actual environments.

Many, many modified structured data examples may be used to simulate driving scenarios where perhaps there is a lack of data.

Figure 4:
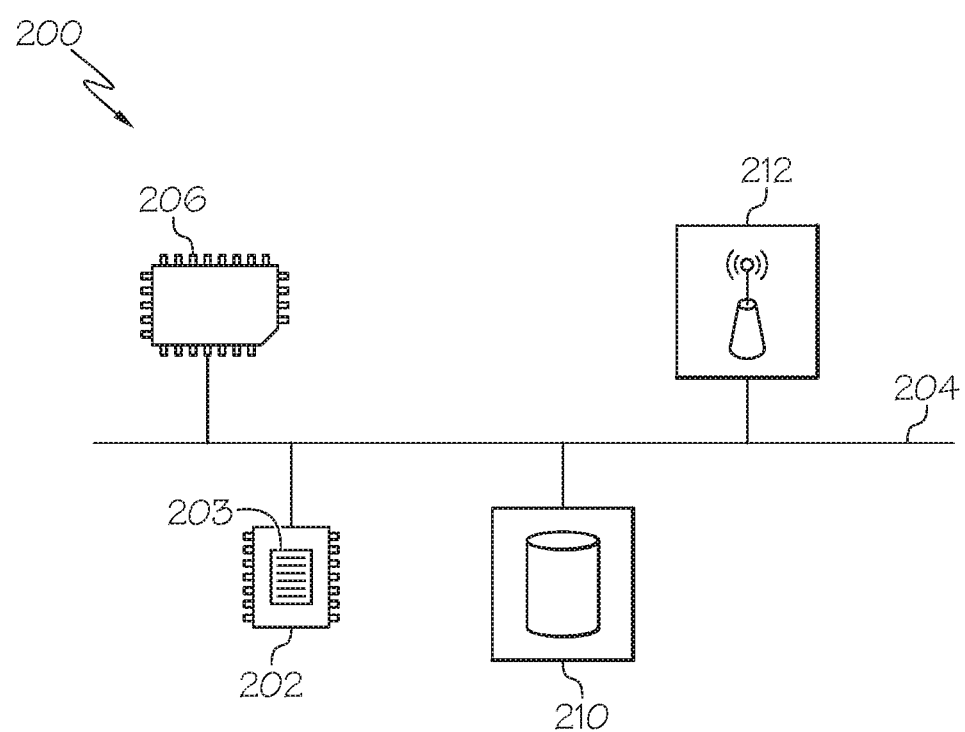
FIG. 4 schematically depicts an example system for training a neural network for estimating a trajectory of a vehicle according to one or more embodiments described and illustrated herein.

Referring now to FIG. 4, a non-limiting, example system 200 for training a neural network for estimating vehicle trajectories is illustrated. The system 200 includes one or more processors 206, a communication path 204, one or more memory modules 202 configured as non-transitory computer-readable medium, a wireless communication module 212 (e.g., network interface hardware for communication with external computing devices, vehicles, and the like), one or more sensors 208, and one or more additional memory modules 210, the details of which will be set forth in the following paragraphs. It should be understood that the system 200 of FIG. 4 is provided for illustrative purposes only, and that other systems comprising more, fewer, or different components may be utilized.

Each of the one or more processors 206 may be any device capable of executing machine readable and executable instructions. Accordingly, each of the one or more processors 206 may be a controller, an integrated circuit, a microchip, a computer, or any other computing device. The one or more processors 206 are coupled to a communication path 204 that provides signal interconnectivity between various components of the system 200. Accordingly, the communication path 204 may communicatively couple any number of processors 206 with one another, and allow the components coupled to the communication path 204 to operate in a distributed computing environment. Specifically, each of the components may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The system 200 includes one or more memory modules 202 coupled to the communication path 204. The one or more memory modules 202 may comprise RAM, ROM, flash memories, hard drives, or any device capable of storing machine readable and executable instructions 203 such that the machine readable and executable instructions can be accessed by the one or more processors 206 and execute the functionalities described herein. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 202. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 4, the system 200 may optionally include one or more additional memory modules 210 that store data relevant to performing the functionalities described herein. For example the one or more additional memory modules 210 may include map data, historical sensor data, other structured data, and other information used to train the neural networks described herein. This additional information may be stored in the one or more memory modules 202 or in additional memory modules 210 as shown in FIG. 4. In some embodiments, all or some of the information stored in the one or more additional memory modules may be stored remotely in a server device. Other variations for storing this additional information are also possible.

The system 200 comprises one or more sensors 208 deployed on vehicles 130 (see FIG. 2). The one or more sensors 208 may include, but are not limited to, LiDAR sensors, RADAR sensors, optical sensors (e.g., cameras, laser sensors, proximity sensors, location sensors), and the like. The sensors 208 produce sensor data that may be used to perform a variety of functions, such as train a neural network, as described in detail above.

Still referring to FIG. 4, the example system 200 comprises wireless communication module 212 (e.g., network interface hardware) for communicatively coupling the system 200 to remote computing devices, a remote server, and the like. The wireless communication module 212 can be communicatively coupled to the communication path 204 and can be any device capable of transmitting and/or receiving data via a network. Accordingly, the wireless communication module 212 can include a communication transceiver for sending and/or receiving any wired or wireless communication. For example, the wireless communication module 212 may include an antenna, a modem, Wi-Fi card, WiMax card, mobile communications hardware, near-field communication hardware, satellite communication hardware and/or any wireless hardware for communicating with other networks and/or devices. In one embodiment, the wireless communication module 212 includes hardware configured to operate in accordance with the Bluetooth® wireless communication protocol.

It should now be understood that embodiments of the present disclosure are directed to systems and methods for training a neural network for estimating a vehicle trajectory. Embodiments enable the easy development of a plethora of driving scenarios by simply modifying structured data without the need for generating simulation data, such as video data. The system combines both sensor data and structured data to initially train the neural network. Then, modified structured data may be used to continue to train the neural network using many, many different driving scenarios without collected sensor data and collected structured data, thereby more precisely training the neural network without the time and cost of generating actual sensor data and/or simulated sensor data.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system for training a neural network for estimating a trajectory of a vehicle, the system comprising:
   one or more processors; and
   a non-transitory computer-readable medium storing computer-readable instructions that, when executed by the one or more processors, cause the one or more processors to:

receive sensor data of a plurality of vehicle maneuver examples from a plurality of vehicle sensors;

input the sensor data into a sensor data neural network to generate a sensor data intermediate space;

receive structured data of the plurality of vehicle maneuver examples;

input the structured data into a structured data neural network to generate a structured data intermediate space;

calculate a first loss between the sensor data intermediate space and the structured data intermediate space using a first loss function;

provide the first loss to the sensor data neural network and the structured data neural network;

input the structured data intermediate space data into a trajectory estimation neural network to generate one or more vehicle trajectories; and control the vehicle according to the one or more vehicle trajectories.

2. The system of claim 1, wherein the first loss function minimizes the first loss.

3. The system of claim 1, wherein the computer-readable instructions further cause the one or more processors to:

input sensor data intermediate space data from the sensor data intermediate space into a sensor data reconstruction neural network to generate reconstructed sensor data;

calculate a second loss between the received sensor data and the reconstructed sensor data using a second loss function; and input the second loss into at least one of the sensor data neural network and the sensor data reconstruction neural network.

4. The system of claim 1, wherein the computer-readable instructions further cause the one or more processors to:

input structured data intermediate space data from the structured data intermediate space into a structure data reconstruction neural network to generate reconstructed structured data;

calculate a third loss between the received structured data and the reconstructed structured data using a third loss function; and input the third loss into at least one of the structured data neural network and the structured data reconstruction neural network.

5. The system of claim 1, wherein the computer-readable instructions further cause the one or more processors to:

calculate a fourth loss between the one or more vehicle trajectories and one or more ground truth trajectories using a fourth loss function; and input the fourth loss into the structured data neural network.

6. The system of claim 1, wherein the computer-readable instructions further cause the one or more processors to:

receive manipulated structured data; and input the manipulated structured data into the structured data neural network such that the one or more vehicle trajectories are based on the manipulated structured data.

7. The system of claim 1, wherein the structured data comprises at least one of a position of a lane and a vehicle.

8. The system of claim 1, wherein the sensor data is image data.

9. A method for training a neural network for estimating a trajectory of a vehicle, the method comprising:

receiving sensor data of a plurality of vehicle maneuver examples from a plurality of vehicle sensors;

inputting the sensor data into a sensor data neural network to generate a sensor data intermediate space;

receiving structured data of the plurality of vehicle maneuver examples;

inputting the structured data into a structured data neural network to generate a structured data intermediate space;

calculating a first loss between the sensor data intermediate space and the structured data intermediate space using a first loss function; and providing the first loss to the sensor data neural network and the structured data neural network;

inputting the structured data intermediate space data into a trajectory estimation neural network to generate one or more vehicle trajectories; and controlling the vehicle according to the one or more vehicle trajectories.

10. The method of claim 9, wherein the first loss function minimizes the first loss.

11. The method of claim 9, further comprising:

inputting sensor data intermediate space data from the sensor data intermediate space into a sensor data reconstruction neural network to generate reconstructed sensor data;

calculating a second loss between the received sensor data and the reconstructed sensor data using a second loss function; and inputting the second loss into at least one of the sensor data neural network and the sensor data reconstruction neural network.

12. The method of claim 9, further comprising:

inputting structured data intermediate space data from the structured data intermediate space into a structure data reconstruction neural network to generate reconstructed structured data;

calculating a third loss between the received structured data and the reconstructed structured data using a third loss function; and inputting the third loss into at least one of the structured data neural network and the structured data reconstruction neural network.

13. The method of claim 9, further comprising:

calculating a fourth loss between the one or more vehicle trajectories and one or more ground truth trajectories using a fourth loss function; and inputting the fourth loss into the structured data neural network.

14. The method of claim 9, further comprising receiving manipulated structured data; and inputting the manipulated structured data into the structured data neural network such that the one or more vehicle trajectories are based on the manipulated structured data.

15. The method of claim 9, wherein the structured data comprises at least one of a position of a lane and a vehicle.

16. The method of claim 9, wherein the sensor data is image data.

* * * * *

UNITED STATES PATENT AND TRADEMARK OFFICE
CERTIFICATE OF CORRECTION

| | |
|---|---|
| PATENT NO. | : 11,628,848 B2 |
| APPLICATION NO. | : 16/836265 |
| DATED | : April 18, 2023 |
| INVENTOR(S) | : Stephen G. McGill and Guy Rosman |

It is certified that error appears in the above-identified patent and that said Letters Patent is hereby corrected as shown below:

In the Specification

In Column 3, Line(s) 23, delete "determine" and insert --determined--, therefor.

In the Claims

In Column 10, Line(s) 53, Claim 14, after "comprising", insert --:--.

Signed and Sealed this
Twentieth Day of June, 2023

Katherine Kelly Vidal
*Director of the United States Patent and Trademark Office*